UNITED STATES PATENT OFFICE.

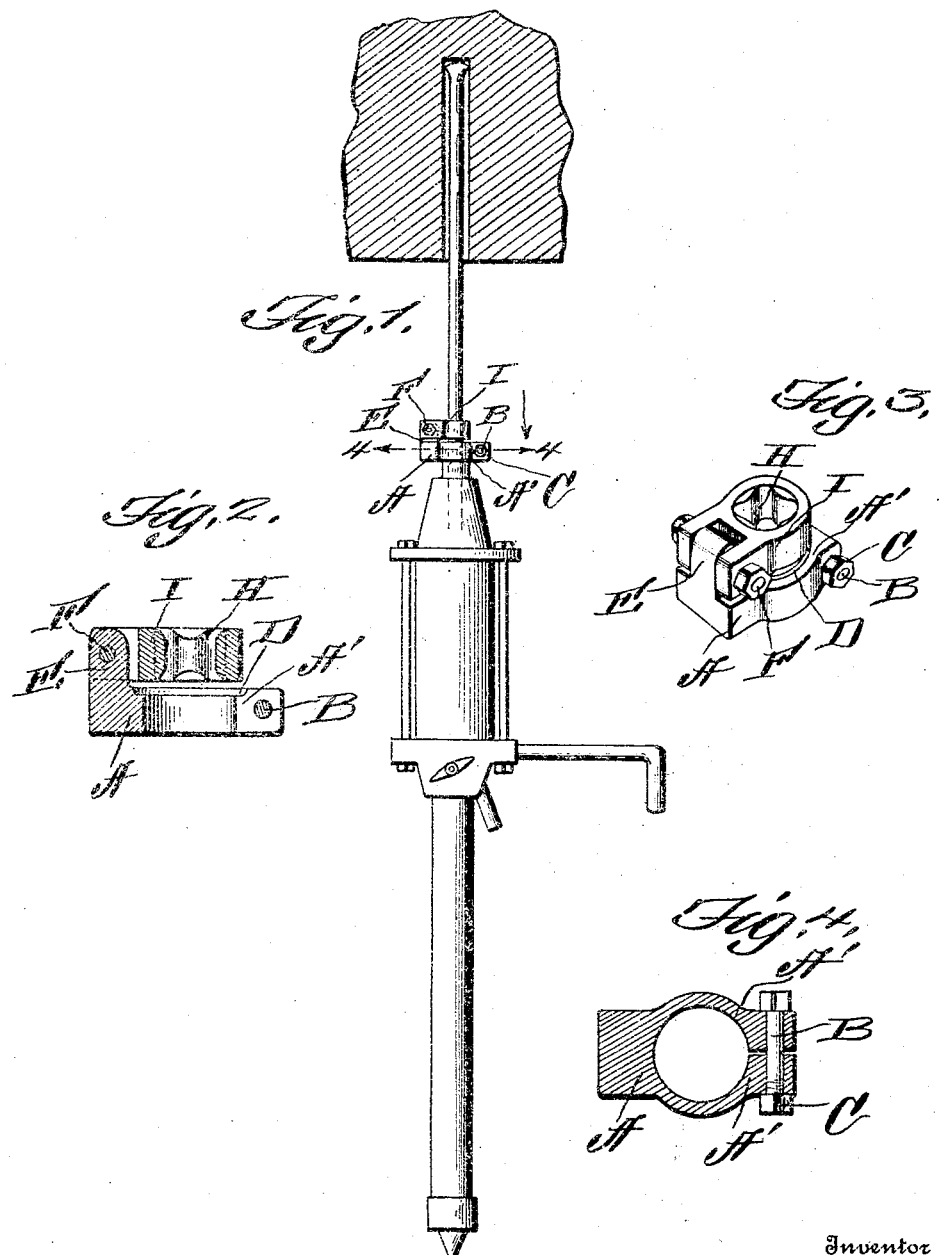

EARL M. BRUNER, OF DENVER, COLORADO.

STEEL-PULLER FOR ROCK-DRILLS.

1,287,209.      Specification of Letters Patent.      Patented Dec. 10, 1918.

Application filed January 14, 1918. Serial No. 211,883.

*To all whom it may concern:*

Be it known that I, EARL M. BRUNER, a citizen of the United States, residing at Denver, in the county of Denver and State of Colorado, have invented certain new and useful Improvements in Steel-Pullers for Rock-Drills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in steel pullers for rock drills, and consists of a simple device of this nature adapted to pull the steels that might stick within the holes being drilled, and consists further of a simple device which will effectually hold the steel in the chuck, and so arranged that when the steel commences to pull out of the chuck, friction upon the upper jaw of the device will throw the same out of alinement with the chuck of the drilling machine, and cause the jaw to bind and hold the steel in the machine.

My invention is illustrated in the accompanying drawings which, with the letters of reference marked thereon, form a part of this specification, and in which:

Figure 1 is a side elevation, showing the application of my invention.

Fig. 2 is a sectional view through the jaws.

Fig. 3 is a perspective view, and

Fig. 4 is a sectional view on line 4—4 of Fig. 1.

Reference now being had to the details of the drawings by letter:—

A designates a clamping member having two resilient jaws A', which are adapted to be clamped to the upper portion of the casing of a drill chuck. B is a bolt passing through registering apertures in the jaws A', and upon which bolt a nut C is mounted, forming means for drawing the jaws frictionally against the casing of the machine.

Said member A has an upwardly extending lug E which carries a pin F, which passes through registering apertures in the walls of a recessed portion of the gripping member I, which latter has an opening H therein, the wall of which is fluted and adapted to grip the circumference of the shank portion of the drill. The upper surface of the member A, about the opening therein, is recessed as at D, adapted to receive the under edge of the member I.

In operation, when the drill is to be pulled out, the member I, tilting upon its pivot to a position at a slight angle to a horizontal, will grip the shank portion of the drill and form a convenient means for withdrawing the drill from the hole that has been bored.

What I claim to be new is:

In combination with a drill chuck and drill, a clamping member having resilient arms adapted to engage a drill chuck, and means for clamping the same about the chuck, the upper part of said member being recessed about a chuck engaging opening therein, said member having an upwardly projecting lug, a drill gripping member having a recess in one edge, the walls of which are apertured, a bolt passing through the apertures in said walls and said lug, said member having a drill engaging opening, its lower edge adapted to fit in the opening in the adjacent face of said clamping member.

In testimony whereof I hereunto affix my signature in presence of two witnesses.

EARL M. BRUNER.

Witnesses:
   FRANK EXLINE,
   MARGARET SCHAAF.

Copies of this patent may be obtained for five cents each, by addressing the "Commissioner of Patents, Washington, D. C."